US009596143B2

(12) United States Patent
Garg et al.

(10) Patent No.: US 9,596,143 B2
(45) Date of Patent: Mar. 14, 2017

(54) NODE DISCOVERY AND CLUSTER FORMATION FOR A SECONDARY STORAGE APPLIANCE

(71) Applicant: Cohesity, Inc., Santa Clara, CA (US)

(72) Inventors: Gaurav Garg, Menlo Park, CA (US); Sashikanth Madduri, Mountain View, CA (US)

(73) Assignee: Cohesity, Inc., Santa Clara, CA (US)

( * ) Notice: Subject to any disclaimer, the term of this patent is extended or adjusted under 35 U.S.C. 154(b) by 99 days.

(21) Appl. No.: 14/341,397

(22) Filed: Jul. 25, 2014

(65) Prior Publication Data
US 2016/0028587 A1    Jan. 28, 2016

(51) Int. Cl.
*G06F 15/177*    (2006.01)
*H04L 12/24*    (2006.01)
*H04L 29/08*    (2006.01)

(52) U.S. Cl.
CPC .......... *H04L 41/12* (2013.01); *H04L 41/0806* (2013.01); *H04L 67/10* (2013.01)

(58) Field of Classification Search
CPC .... H04L 41/0803–41/082; H04L 41/12; H04L 67/104–67/1093
See application file for complete search history.

(56) References Cited

U.S. PATENT DOCUMENTS

| | | | | |
|---|---|---|---|---|
| 6,012,088 A | * | 1/2000 | Li | G06F 9/44505 709/219 |
| 7,085,814 B1 | * | 8/2006 | Gandhi | H04L 29/1232 709/208 |
| 2004/0003111 A1 | | 1/2004 | Maeda et al. | |
| 2008/0072038 A1 | * | 3/2008 | Yi | H04L 9/085 713/156 |
| 2009/0282132 A1 | | 11/2009 | Pappas et al. | |
| 2011/0110223 A1 | | 5/2011 | Dutta et al. | |
| 2011/0162018 A1 | * | 6/2011 | Dodd | H04N 21/4333 725/78 |
| 2011/0185047 A1 | * | 7/2011 | Vaidyanathan | H04L 41/0893 709/220 |
| 2013/0046865 A1 | | 2/2013 | Liu | |
| 2014/0241210 A1 | * | 8/2014 | Tokunaga | H04L 41/12 370/254 |

OTHER PUBLICATIONS

International Search Report and Written Opinion dated Oct. 23, 2015 for International Application No. PCT/US2015/041742.

* cited by examiner

*Primary Examiner* — Brendan Higa
(74) *Attorney, Agent, or Firm* — Patterson+Sheridan, LLP (57) ABSTRACT

Techniques are disclosed for identifying "free" compute nodes that have not been configured as a member of a secondary storage system. As disclosed, a node may automatically detect that it is a free node (i.e., one available to join a distributed computing cluster which provides the secondary storage system or to form a new cluster). When a node detects that it is not part of a cluster, the node may build an initial network configuration and begin advertising itself as a free node. Once the initial network state is available, the node may broadcast advertisements observed by a management tool and joined to the secondary storage system.

22 Claims, 8 Drawing Sheets

NODE DISCOVERY AND CLUSTER FORMATION FOR A SECONDARY STORAGE APPLIANCE

BACKGROUND

Field

Embodiments presented herein generally relate to distributed computing. More specifically, embodiments presented herein provide techniques for automatically discovering, configuring and adding new computing nodes to a secondary storage appliance.

Description of the Related Art

A distributed computing cluster uses multiple computer systems or "nodes" to achieve a common goal or provide a common service. Each node includes its own memory, storage, processing power, and applications used to provide the services (or parts of the services) of the cluster. One example of a distributed computing system is a secondary storage cluster used to provide a variety of services for a primary storage system. For instance, a secondary storage system can provide data backup services for the primary cluster, as well as provide views of backup data to other clients.

Secondary storage systems are frequently used in large data centers, where hundreds or even thousands of computing servers host enterprise applications. In such a case, a primary storage system can regularly store terabytes of data, backed up to the secondary storage system. In large data centers, the secondary storage system can include hundreds of computing nodes used to form the cluster. One advantage to using a cluster is that nodes can be added (or removed) from the cluster as needed. That is, the cluster can scale as needed to provide backup services to the primary storage system.

After placing a new node (or nodes) in a datacenter, an administrator typically connects a display device/keyboard to the node and manually configures network (and other) settings on each new node. For example, an administrator may assign an IP address, IPMI settings, as well as configure other settings to allow the node to participate in the cluster. In many cases, the nodes of a cluster need to be assigned a static IP address (as changes due to the expiration of an IP address lease can be disruptive to the cluster). However, manually configuring each node can be both burdensome and time consuming for the administrator, particularly where many new nodes are added to secondary storage cluster. Further, if an administrator is configuring a large number of nodes, the possibility that mistakes will be made increases. For example, a node could be overlooked entirely (e.g., an administrator configures only 31 of 32 new nodes). After configuring the nodes, the administrator then has to manually enter the IP address assigned each node to form a cluster or to add new nodes to an existing cluster. This manual process also involves some risk, as even simple mistakes on the part of administrator can potentially affect unrelated nodes (e.g., listing an incorrect IP address for a node in the cluster can cause network conflicts). The administrator has to maintain an inventory of nodes that are available to form a cluster to join an existing cluster of a secondary storage system.

SUMMARY

One embodiment presented herein includes a method for indicating a presence of a node in a distributed computing cluster. This method may generally include determining, by operation of one or more computer processors, that the node has not been configured as a member of a distributed computing cluster. In response, the node configures a first network state, determines a node identifier (ID) for the node, and broadcasts one or more messages advertising the node ID and a network address of a configuration interface hosted by the node.

In a particular embodiment, the distributed computing cluster is a secondary storage system providing backup services for a primary storage system. Additionally, the first network state can be configured using a DHCP service to obtain a temporary network address for broadcasting the one or more messages or using a link-local network address assigned to a network interface on the node.

In a particular embodiment, this method may further include receiving, over the configuration interface, configuration data used to configure a second network state on the node, configuring the second network state on the node; and joining the distributed computing cluster.

Still another embodiment presented herein includes a method for managing cluster membership in a distributed computing cluster. This method may generally include detecting a message broadcast by a compute node. The message indicates that the compute node has not been configured as a member of the distributed computing cluster and wherein the compute node broadcasts the message using a first configured network state on the compute node. This method may also include determining from the message, a node ID and a network address of a configuration interface hosted by the compute node and sending the compute node, over the configuration interface, configuration data. The compute node applies the configuration data on the compute node to configure a second network state on the compute node. Once configured, the compute joins the distributed computing cluster after configuring the second network state. In a particular embodiment, the distributed computing cluster is a secondary storage system providing backup services for a primary storage system.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of invention presented herein provide techniques for a node in a data center to automatically detect that it is a free node (i.e., one available to join a cluster of a secondary storage system or to form a new cluster). When a node detects that it is not part of a cluster, the node may build an initial network configuration and begin advertising itself as a free node. For example, the node may obtain a temporary network address from a DHCP service hosted in the data center. Alternatively, the node could configure a link-local network state. Once a temporary network state is available, the node may broadcast advertisements observed by a management tool used to deploy nodes to a secondary storage cluster.

The management tool may be one of the configured nodes in the cluster or an independent system used to manage cluster membership and free nodes. In one embodiment, the node may broadcast messages formatted using a zero configuration network protocol, such as Avahi or Bonjour. Of course other zero configuration protocols could be used. Self-advertisement of nodes significantly reduces the management overhead of nodes used to provide a secondary storage system in a data center.

In one embodiment, each node is assigned (or generates) a unique identifier, e.g., based on a MAC address or GUID. This node ID is then advertised as part of the messages broadcast by the node. For example, the node may include the node ID in a TXT record broadcast in advertisements formatted using the zero configuration protocol. A cluster configuration tool can detect free nodes in the data center, allowing an administrator to form the cluster by specifying node IDs to include in the cluster. Internally, the configuration tool can determine a static network configuration for the node, e.g., an IP address, IPMI settings, DNS server settings, network interface bonding, etc., to assign to the node. The configuration tool allows the administrator to identify which nodes are members of a secondary storage cluster, identify a pool of free nodes, assign nodes to existing clusters, and form new clusters. The resulting cluster information may be stored by the configuration tool. Accordingly, the administrator does not need to maintain an inventory of free nodes or an inventory of cluster membership or to manually visit each node to configure it as part of the cluster. Further, nodes may be configured remotely using link local address even if DHCP is disabled in the data center network. Thus, the administrative burden to form a cluster or add new nodes to a cluster is significantly simplified.

Note, embodiments are described below using a distributed computing cluster used to provide a secondary storage system as a reference example of a cluster where nodes by be automatically detected and managed by the cluster. However, one of ordinary skill in the art will recognize that embodiments of the invention may be adapted for a variety of computing clusters where computing nodes may be added to the data center and automatically discovered by other nodes in the cluster.

Figure 1:
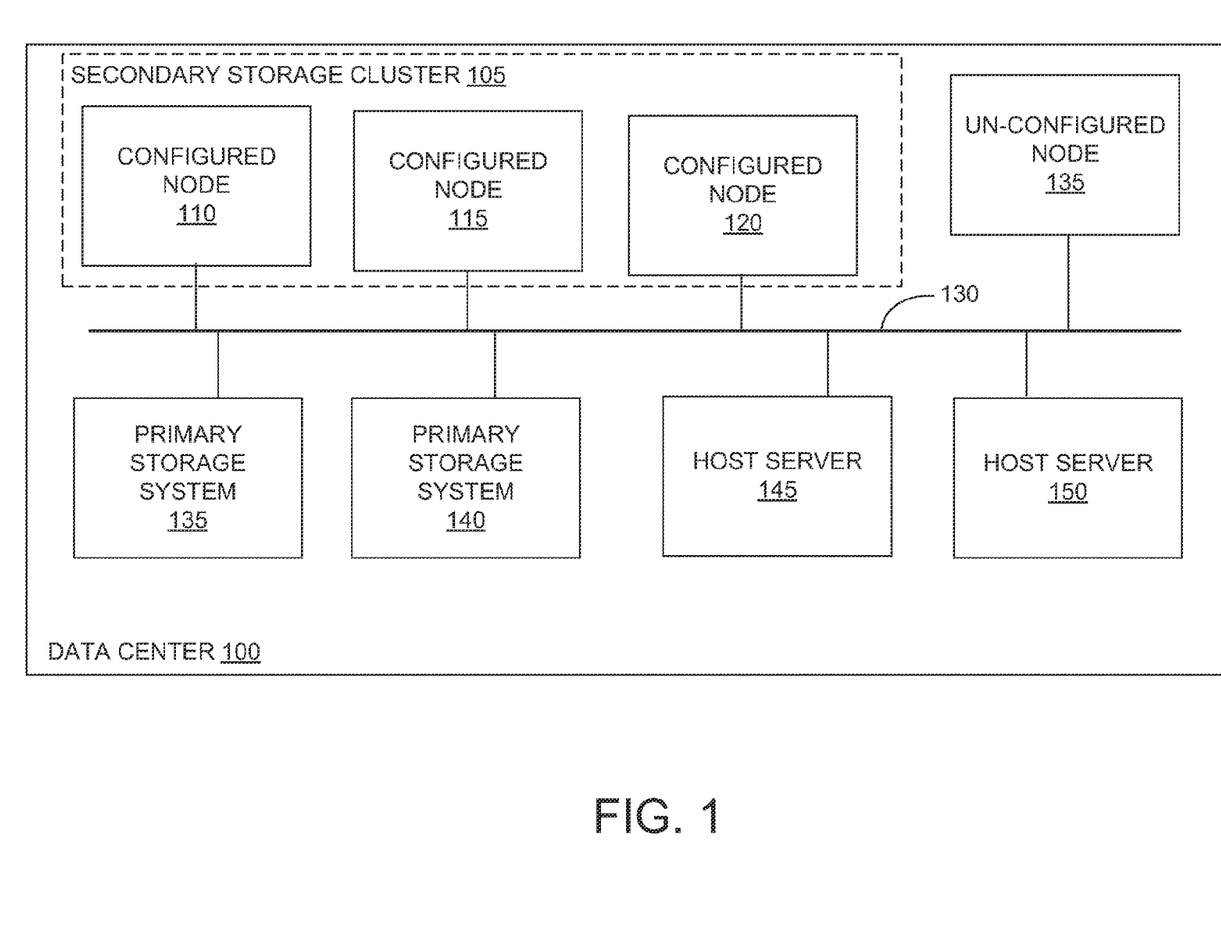
FIG. 1 illustrates an example computing environment, according to one embodiment.

FIG. 1 illustrates an example data center computing environment 100, according to one embodiment. As shown, the computing environment 100 includes host systems 140, 150, primary storage systems 135, 140, and a secondary storage cluster 105, each connected to a data center network 130. The distributed cluster 105 itself includes computing servers 110, 115, and 120 (or "nodes"). The host servers 145, 150 are used to provide computing resources and applications to clients. For example, then host servers 145, 150 could be used to host virtual machine instances for a cloud based computing platform, but could also host web servers, application servers, database systems, enterprise applications, etc. In the case of virtual machine instances, e.g., the host servers 145, 150 could store files and virtual machine data (e.g., VMDK files) on the primary storage systems 135, 140.

The secondary storage cluster 105 provides backup services to the primary storage systems 135, 140. For example, the secondary storage cluster 105 could create a rolling backup of the files stored on the primary storage systems 135, 140, e.g., by capturing a snapshot view of the primary storage systems every five minutes. To do so, the secondary storage cluster 105 could communicate with the primary storage systems 135, 140. For example, assume the secondary storage cluster provides backup services for virtual machine instances hosted on host servers 145, 150. In such a case, the secondary storage cluster could use the vStorage APIs for Data Protection APIs (available from VMware, Inc.) to obtain backup copies of VMDK files stored on the primary storage systems 135, 140. Of course, depending on files or data backed up by the secondary storage cluster 105, a variety of other protocols for obtaining data or files from the primary storage systems 135, 140 could be used.

As shown, the secondary storage cluster 105 includes configured nodes 110, 115, 120. In this example, assume an administrator has configured cluster 105 with a membership which includes nodes 110, 115, and 120. Additionally, assume the administrator has deployed an unconfigured node 135 in the data center computing environment 100. As described below, in one embodiment, the unconfigured node 135 may include a cluster management component which recognizes that node 135 has not been configured as a member of the secondary storage cluster 105. Further, in response, the management component may build a temporary network configuration and begin advertising unconfigured node 135 as being present in the data center environment 100 and available to be joined to the secondary storage cluster 105. Note, while shown as a single unconfigured node, it is common for an administrator to deploy large numbers of nodes at once in data center environments. In such a case, each such node would begin advertising its presence, allowing the administrator to configure a permanent network state on each node as well as add nodes to a cluster 105 (or create new clusters), without having to visit and configure each node individually and without having to manually maintain configuration data as each such node is configured and joined to cluster 105.

Figure 2:
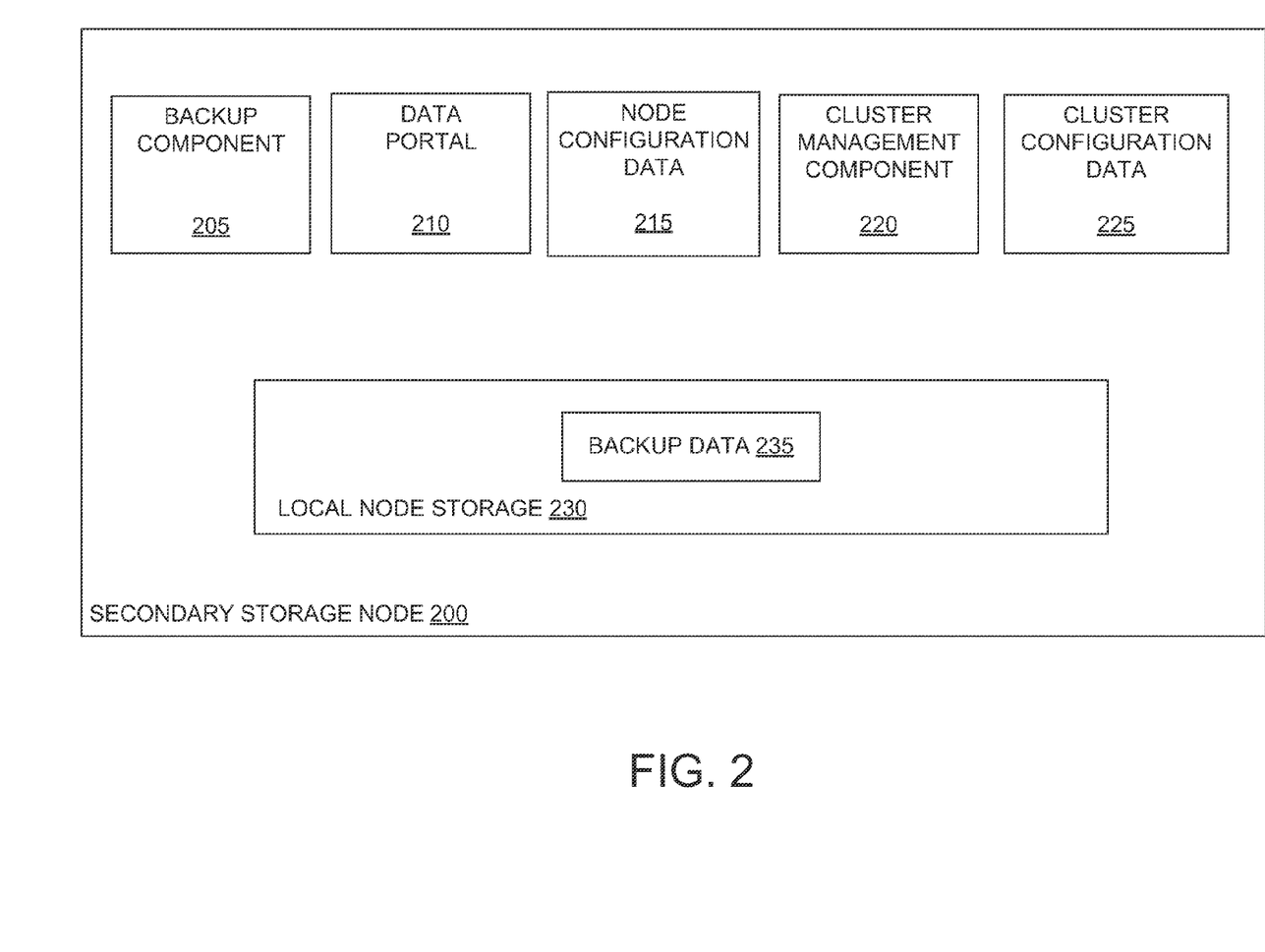
FIG. 2 illustrates an example node in a distributed computing cluster used to provide a secondary storage system, according to one embodiment.

FIG. 2 provides a functional view of a node 200 in a distributed computing cluster which provides a secondary storage system, according to one embodiment. Node 200 generally provides a computing system with one or more processors, computer memory, networking hardware, storage devices (e.g., hard disk drives (HDD) and solid-state devices (SSD)), etc., along with an operating system and user level applications. As shown, the node 200 includes a backup component 205, a data portal component 210, node configuration data 215, cluster management component 220, cluster configuration data 225, and storage 230 storing backup data 235.

The backup component 205 provides one or more software applications used to obtain backup data from other systems. As noted above, the backup component 205 may use APIs provided for a particular primary storage system or host server. For example, the backup component could use the RMAN protocol to fetch backup data from an Oracle database or use the VMware VADP APIs to fetch data from a primary system running a VMware cluster. Of course, depending on the primary system being backed up by the secondary storage node 200, other protocols for fetching backup data would be used Files or data fetched by the backup component 205 may be stored in local node storage 230 (e.g., HDD or SSD drives), as well as on other nodes in the cluster. Generally, to tolerate a failure of N nodes, the cluster stores at least N+1 distinct copies of backup data 235. The backup data 235 generally allows a primary storage system to be restored to a state captured by any snapshot taken of the primary storage system. In addition to restoring backup data 235, the node 200 may also export backup data 235 for use by external systems. For example, data portal 210 may present a clone of the backup data 235 (i.e., a copy of a given snapshot) as an NFS or SMB mount point. Doing so allows an enterprise to use a backup clone for test and development systems, among other uses.

Node configuration data 215 may be used to specify any configurable parameters related to the secondary storage node 200. For example, the node configuration data 215 may include a network IP address, any virtual IP addresses, IPMI settings, network routing information, node ID information, ID of the cluster of which the node is a member. Other configuration data includes DNS settings, NTP settings, network interface bonding, etc. The configuration data 215 may relate to a temporary network state used to advertise the presence of node 200 in a data center as an unconfigured secondary storage node or may relate to an assigned network state after the node 200 has been configured by an administrator (e.g., in response to the advertisements).

Cluster management component 220 provides one or more software applications configured to detect a current state of node 200 as being configured as part of a secondary storage cluster or unconfigured or "free" node. In one embodiment, when the cluster management component 220 detects that the node 200 is not a member of a cluster, the management component 220 builds a temporary network state and advertises itself as a free node that may added to an existing cluster or used with other nodes to form a new cluster. Cluster configuration data 225 specifies the membership of node 200 as part of a secondary storage cluster, e.g., by referencing an identifier assigned to the cluster.

Figure 3:
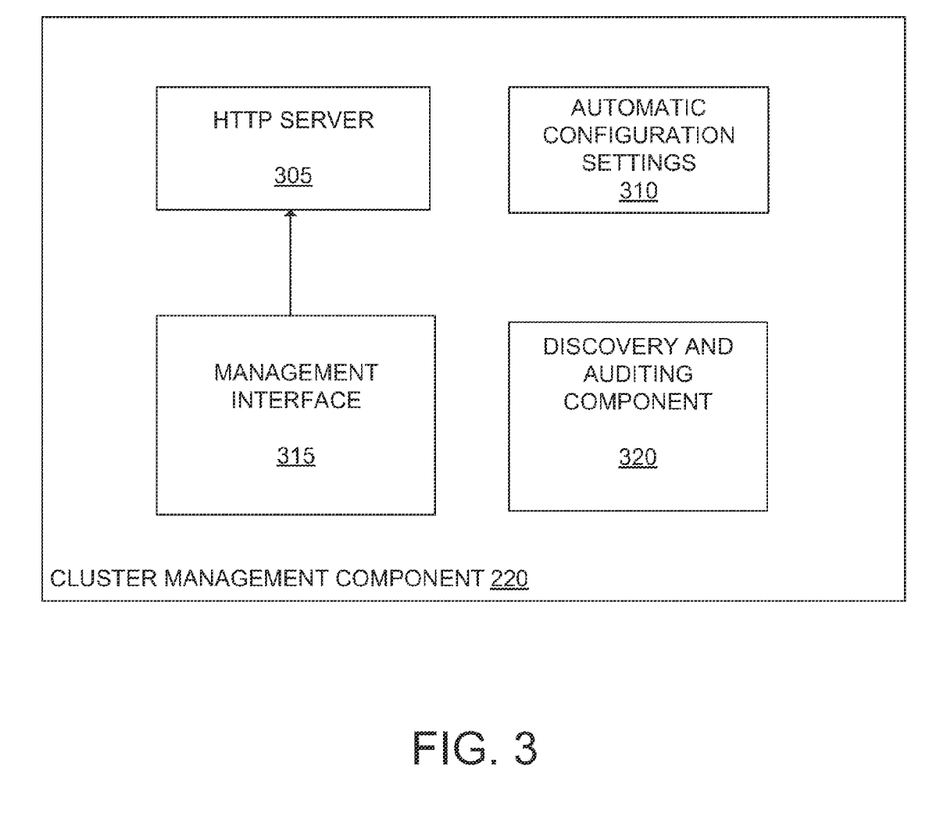
FIG. 3 illustrates an example of a configuration management component in a distributed computing cluster, according to one embodiment.

FIG. 3 further illustrates an example of a configuration management component 220 in a distributed computing cluster, according to one embodiment. As shown, the management component 220 includes an HTTP Server 305, a management interface 215, configuration settings 310, and a discovery and advertising component 320.

In one embodiment, the discovery and advertising component 320 determines whether a node has been configured as a member of a cluster. If not, the advertising component 320 may build a temporary network state, e.g., by obtaining a network address from a DCHP service and begins advertising the presence of the node within a data center. If no DHCP service is available, then the advertising component 320 may use a link-local network address to advertise the node's presence on the data center network. The configuration settings 310 may store the temporary network state used to advertise the node's presence. In one embodiment, advertisements broadcast by the advertising component 320 may be formatted using a zero configuration network protocol, e.g., Avahi. The advertising component 320 may include a node ID along with other information regarding the configuration settings or capabilities of the node in a TXT record broadcast in advertisements formatted using the zero configuration protocol. For example, the node may advertise a network address and port over which HTTP server 305 may be reached. The TXT record could also identify current software version of the secondary storage applications installed on the free node. Doing so may be useful for determining whether the free node is comparable with other free nodes or with the software installed on the nodes of a cluster The HTTP server 305 provides access to a management interface 315. The management interface 315 generally exposes the configuration settings 310 of the node and allows an administrator to assign a permanent network state to the node and to add the node to a secondary storage cluster. For example, an administrator may use the management interface 315 to assign a static IP address to the node, specify IPMI settings, specify a cluster ID of a cluster the node should join (or form), as well as configure a variety of properties of the node as a member of a secondary storage cluster. Alternatively, the HTTP server 305 and management interface 315 may provide web services which a cluster management system can use to automatically identify, configure, and join a node to a secondary storage cluster without requiring manual intervention from an administrator.

Figure 4:
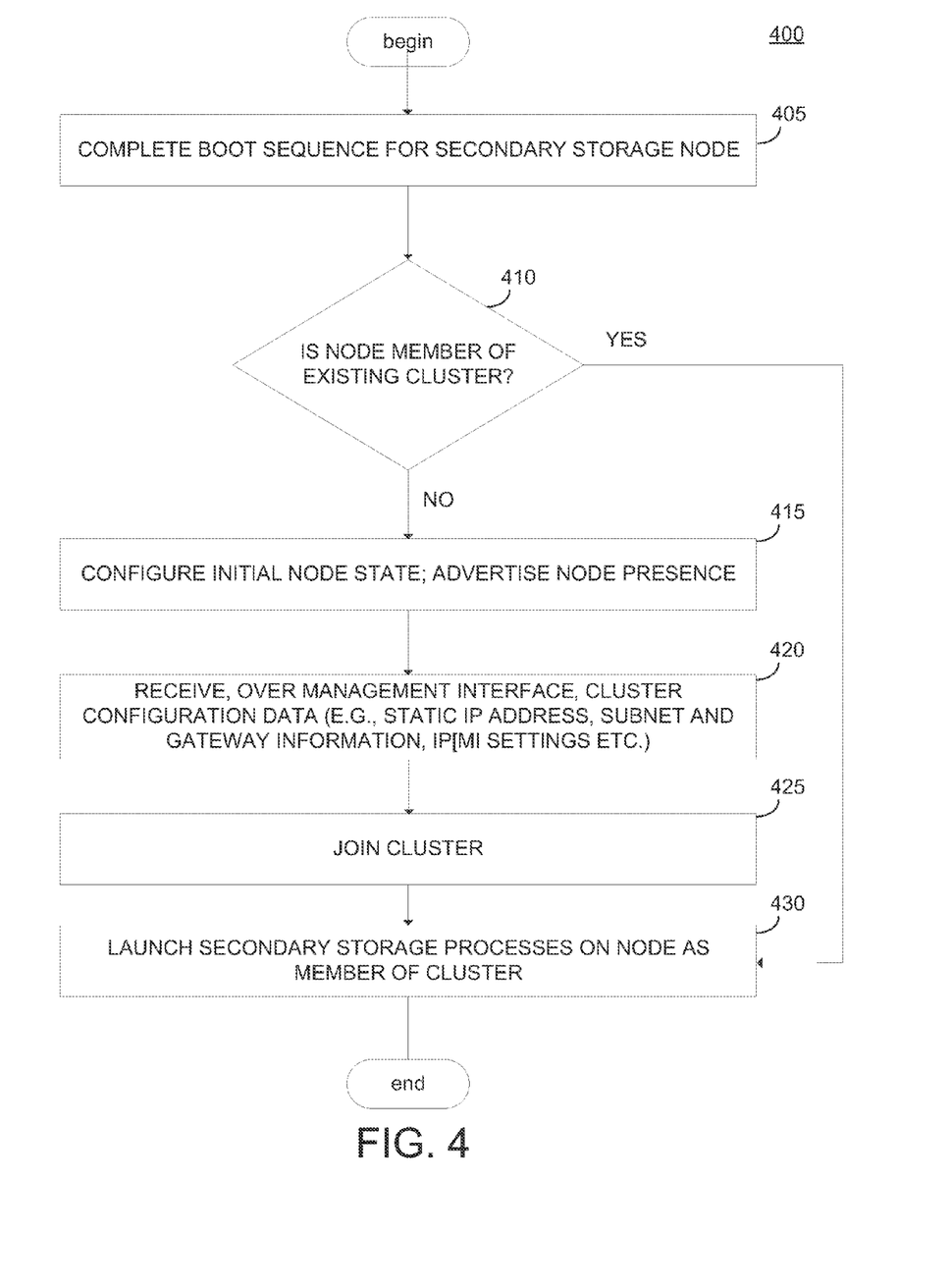
FIG. 4 illustrates a method for automatically discovering, configuring, and adding new computing nodes to a distributed computing cluster, according to one embodiment.

FIG. 4 illustrates a method 400 for automatically discovering, configuring, and adding new computing nodes to a distributed computing cluster, according to one embodiment. As shown, the method 400 begins at step 405 where a computing node is added to a data center and powered on. After performing an initial boot sequence, the node determines whether it has been configured as a member of a secondary storage cluster (step 410). For example, after completing the boot sequence, the node may launch a discovery and advertising component which determines whether the node has been configured as part of a secondary storage cluster. If so, then the node launches the processes used by the node as a member of the secondary storage cluster (step 430).

Otherwise, at step 415, the node builds an initial network state (e.g., using a DCHP service or link-local address) and begins advertising its presence as a "free" node over the initial network state. As noted, the advertisements may include a node ID along with a network address and port of a management interface on the node. At step 420, the node receives cluster configuration data over a management interface used to join the node to a secondary storage cluster. For example, the node may receive a cluster ID, static IP Address, IPMI settings, etc. If needed, the node may reboot itself to allow configuration settings to be applied.

At step 425, after applying the configuration settings, the node joins a secondary storage cluster. And at step 430 launches processes used by the node as a member of the secondary storage cluster (e.g., launches the components shown in FIG. 2).

Figure 5:
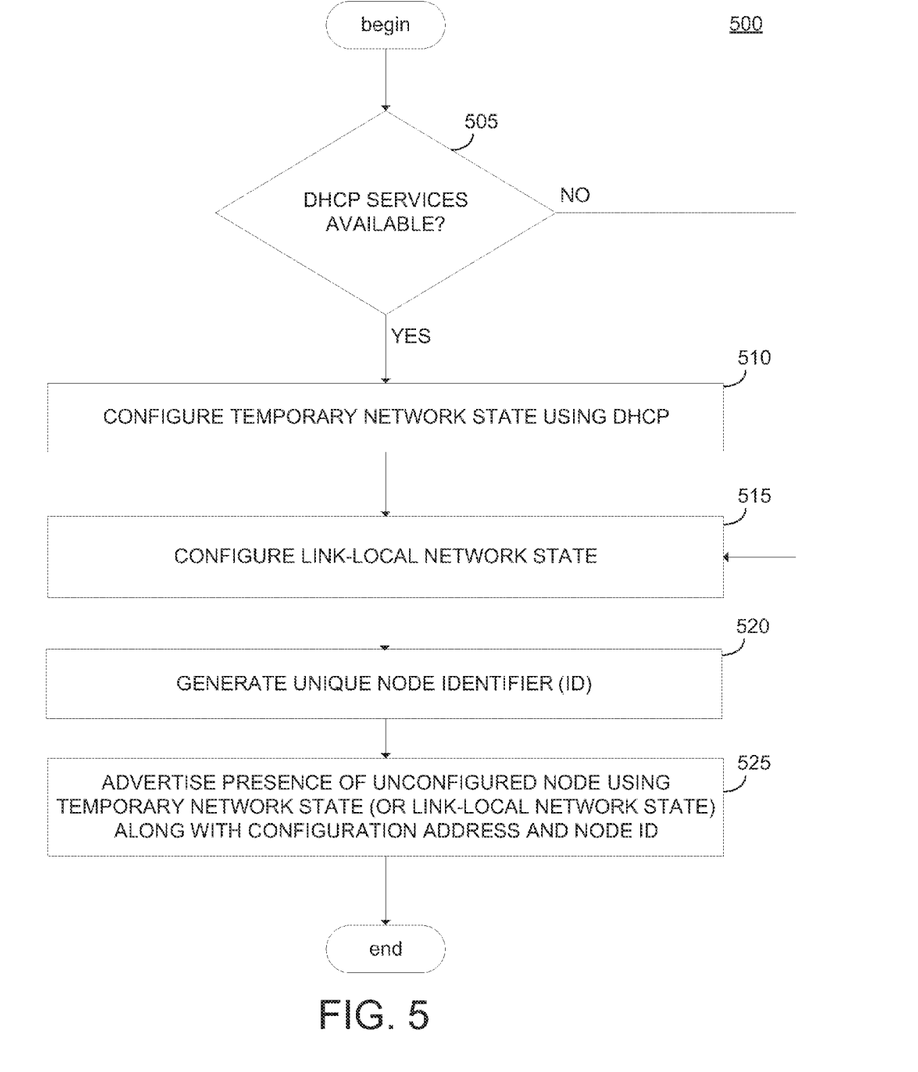
FIG. 5 illustrates a method for discovering a new node added to a secondary storage server, according to one embodiment.

FIG. 5 illustrates a method 500 for discovering a new node added to a secondary storage server, according to one embodiment. Method 500 further illustrates steps 410 and 415 of method 400. As shown, method 500 begins at step 505 where, after determining it has not been configured as part of a secondary storage cluster, a node determines whether a DHCP service is available. If so, the node configures a temporary network state using the DCHP service (step 510). If the node is unable to locate a DCHP service in the data center network, then the node may configure a link-local network state (step 515). As known, a link-local address is a network address limited to communications on the network segment which the node is connected. After configuring the temporary network state (i.e., either the DHCP based state or the link local address), the node then generates (or obtains) a distinct identifier (step 520). For example, the node may use a MAC address of a network interface on the node (or generate a value from the MAC address, or generate a GUID. Of course, other techniques could be used to create distinct identifier (within a given network domain) used to identify a node of a secondary storage cluster.

At step 525, after generating the node identifier, the node advertises its presence in the data center using the temporary network state (or using the link-local network state). As noted, the advertisements may be formatted using a zero configuration networking protocol, e.g., Avahi. The advertisements may include the node ID generated at step 520, as well as a network address and port of a management interface on the node. Such information may be stored in a TXT record of the zero configuration protocol messages.

Figure 6:
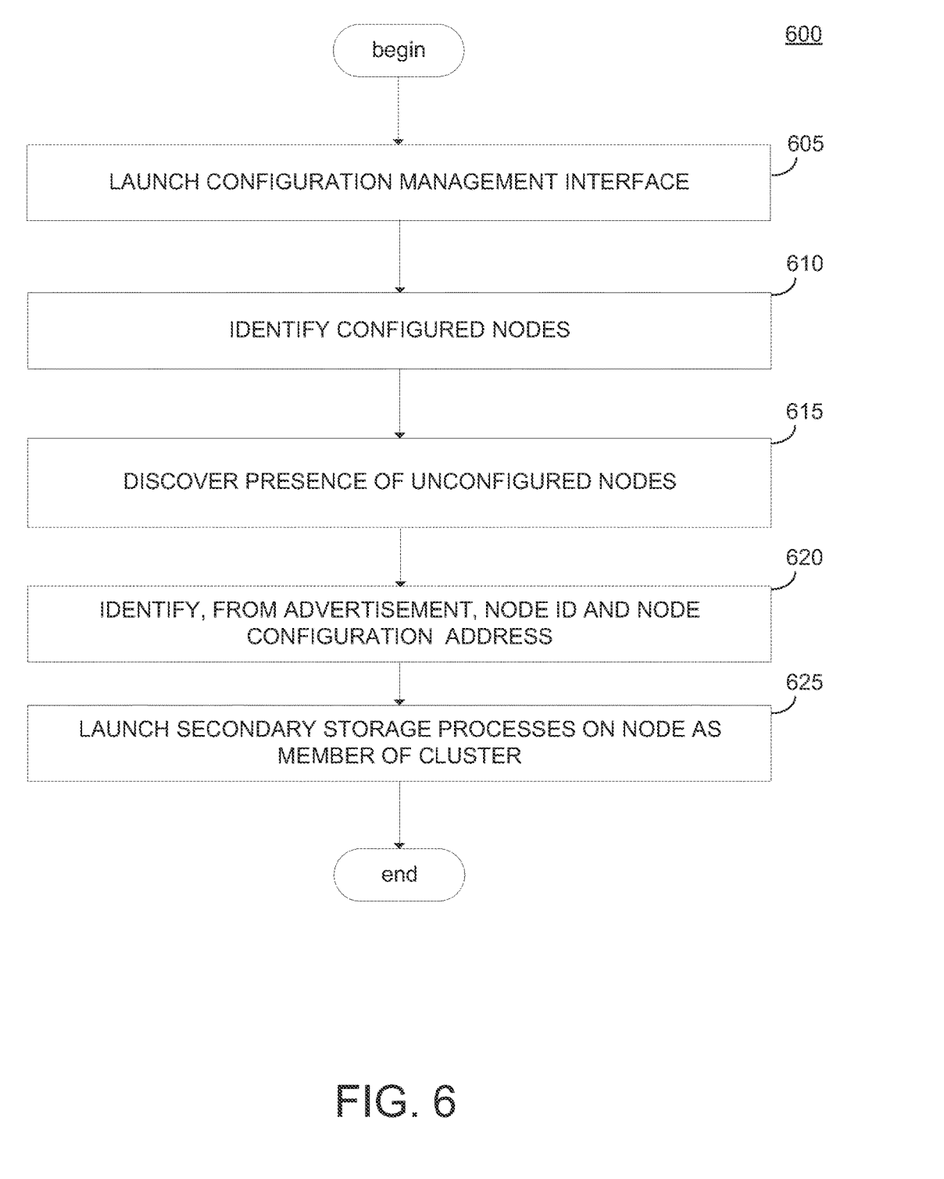
FIG. 6 illustrates a method for configuring a newly discovered node as part of a secondary storage system, according to one embodiment.

FIG. 6 illustrates a method 600 for configuring a newly discovered node as part of a secondary storage system, according to one embodiment. Method 500 further illustrates step 420 of method 400. As shown, the method 600 begins at step 605 where an administrator launches a configuration tool used to configure a secondary storage cluster. In one embodiment, the configuration tool is an application running on one of the nodes in the cluster. Of course, the confirmation tool could be running on a computing system used by an administrator to monitor and configure nodes of the cluster that is not itself part of the cluster.

At step 610, the configuration tool identifies configured nodes. That is, the tool identifies nodes that are already configured as part of part of a secondary storage cluster. At step 615, the configuration tool disclosers the presence of an unconfigured node (or nodes). That is, the configuration tool recognizes a zero configuration message broadcast by the free node. As noted, such message may indicate a node ID associated with the free node along with a temporary (or link-local) address and port used to access a management and configuration interface on the free node. At step 620, the configuration tool identifies the node ID and temporary network address of the "Free" node. At step 625, the administrator configures a permanent network state on the "free" node and may assign the node to a secondary storage cluster.

Figure 7:
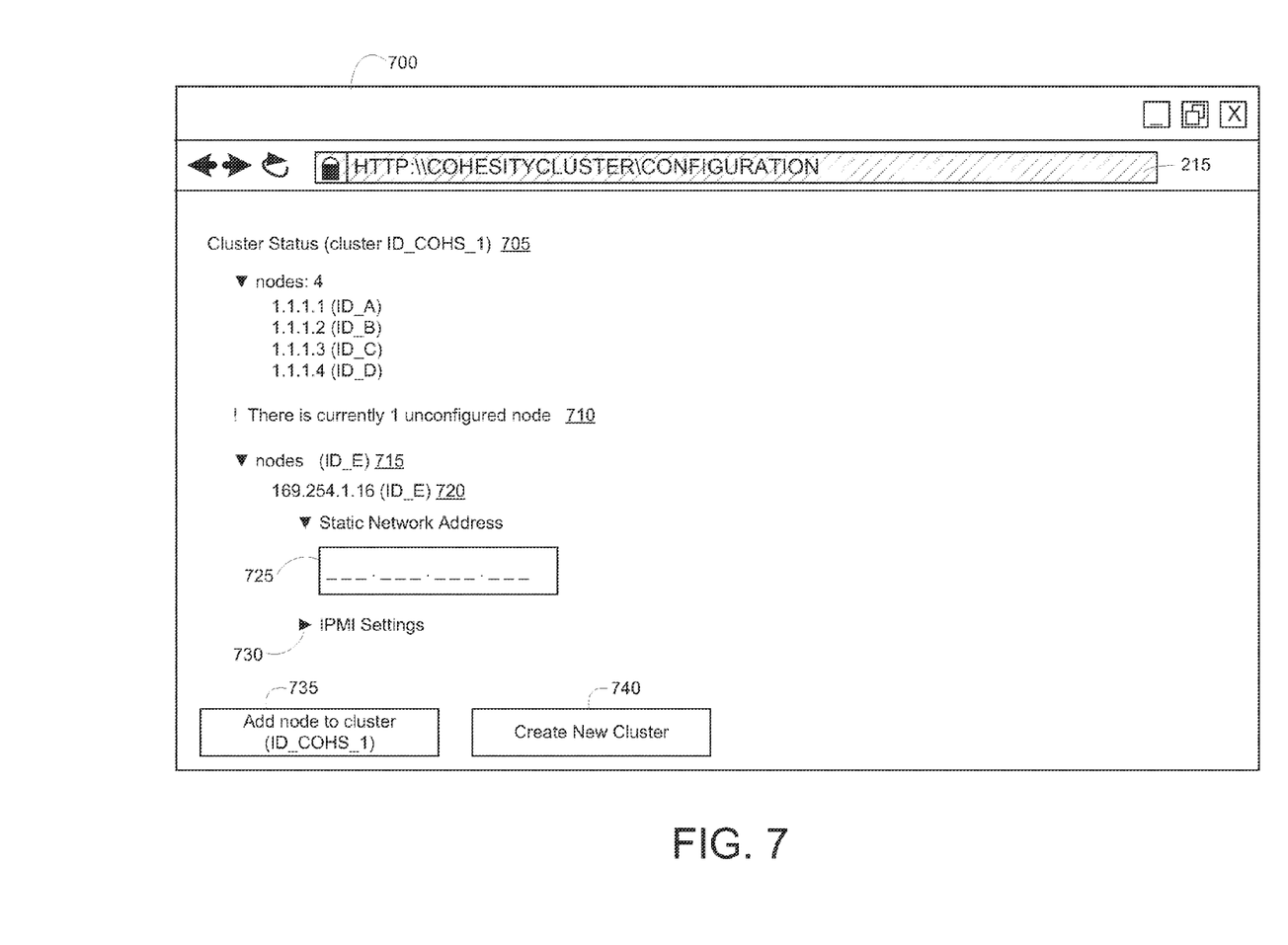
FIG. 7 illustrates an example interface presenting discovered free nodes of a secondary storage system, according to one embodiment.

FIG. 7 illustrates an example interface 700 used to present discovered nodes to add to a secondary storage system, according to one embodiment. As shown, the interface 700 shows a status 705 of a secondary storage cluster. In this particular example, the cluster includes four nodes—listed using IP addresses and node IDs. In addition, the interface 700 shows an alert 710 indicating the presence of an unconfigured node. As noted, the configuration tool may discover the presence of such an unconfigured node by listing for advertisements broadcast using a zero configuration protocol, e.g., Avahi. In this particular example, the alert 710 indicates that the presence of one unconfigured node has been detected. Further, the alert 700 indicates that the node has a node ID 715 of ID_E and a network address 720 of 169.254.1.16 (indicating that the "free" node is using a link-local address to broadcast zero configuration messages). In addition, the interface 700 includes a text box 725 used to specify a static IP Address for the free node, as well as a control 730 used to display and manage IPMI settings. Once the free node is configured, the administrator may add the node to the cluster (using button 735) or create a new cluster using the free node (using button 740). Of course, the interface 700 could include components used to manage any appropriate settings of a "free" as well as components used to manage a variety of aspects of the secondary storage cluster.

Figure 8:
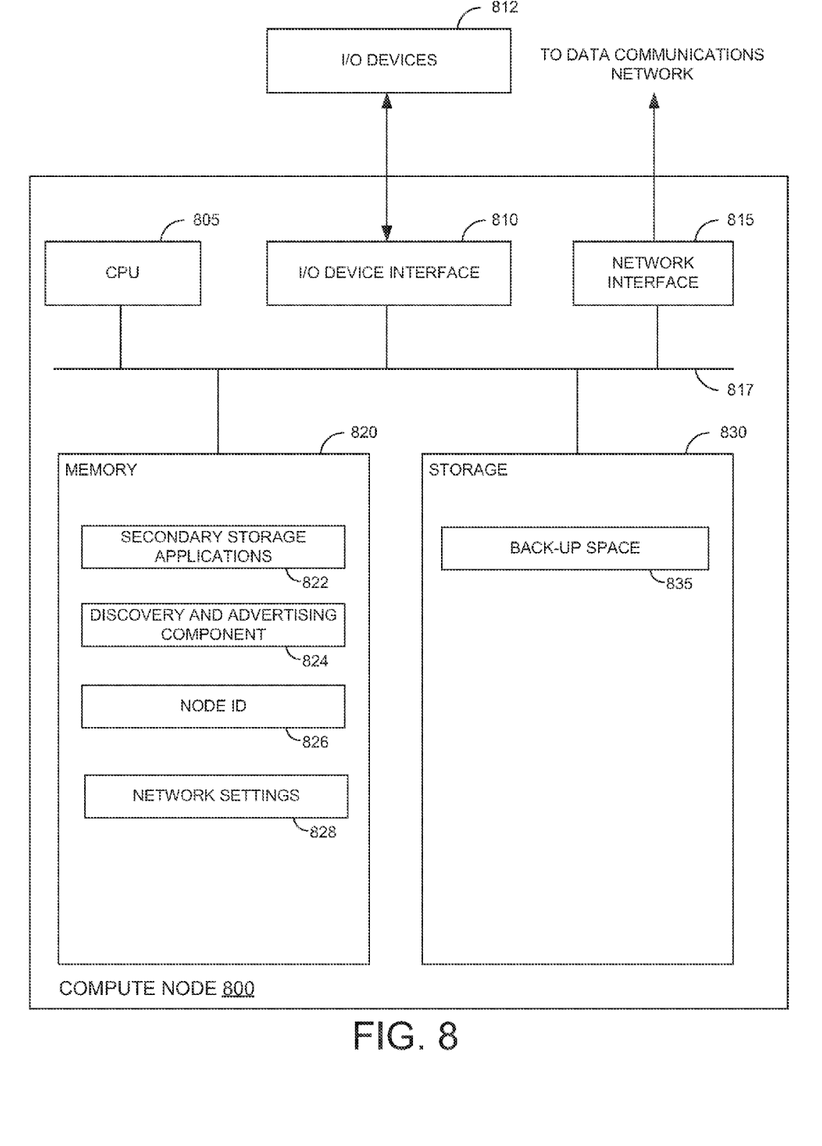
FIG. 8 illustrates a compute node that can be joined to a secondary storage system, according to one embodiment.

FIG. 8 illustrates a compute node 800 that can be joined to a secondary storage system, according to one embodiment. As shown, compute node 800 includes, without limitation, a central processing unit (CPU) 805, a network interface 815, a memory 820, and storage 830, each connected to a bus 817. Compute node 800 may also include an I/O device interface 810 connecting I/O devices 812 (e.g., keyboard, display and mouse devices) to the compute node 800. Further, in context of this disclosure, the computing elements shown in compute node 800 may correspond to a physical computing system (e.g., a system in a data center) or may be a virtual computing instance executing within a computing cloud.

CPU 805 retrieves and executes programming instructions stored in memory 820 as well as stores and retrieves application data residing in the storage 830. The bus 817 is used to transmit programming instructions and application data between CPU 805, I/O devices interface 810, storage 830, network interface 815, and memory 820. Note, CPU 805 is included to be representative of a single CPU, multiple CPUs, a single CPU having multiple processing cores, and the like. Memory 820 is generally included to be representative of a random access memory. Storage 830 may be a disk drive storage device. Although shown as a single unit, storage 830 may be a combination of fixed and/or removable storage devices, such as hard disk drives (HDD), solid state storage (SSD) device, network attached storage (NAS), or a storage area-network (SAN).

Illustratively, memory 820 includes a suite of secondary storage applications 822, a discovery and advertising component 824, a node ID 826, and network settings 828, and storage 830 includes backup space 835. In one embodiment, the secondary storage applications 822 includes the components discussed above relative to FIG. 2, along with any other processes, applications, or modules, etc., used to by compute node 800 to participate as a member of a distributed cluster providing secondary storage services to a primary storage system and host systems. Accordingly, the backup space 825 represents any combination of SSD and HDD storage used to store files or backup data from primary systems (e.g., snapshots of VMDK files stored by a primary storage system).

Discovery and advertising component 824 provides the software applications used to determine that compute node 800 has been deployed in a data center environment, but has not been configured as part of a secondary storage cluster. Accordingly, the discovery and advertising component 824 may configure network settings 828 (e.g., using a DHCP service) or determine link-local settings and begin advertising a node ID 826 and a network address used to configure the compute node using zero configuration messages, as described above.

Advantageously, as described, embodiments presented herein allow an administrator to identify "free" nodes that have not been configured as a member of a secondary storage cluster, assign free nodes to existing clusters, and form new clusters. The resulting cluster information may be stored by the configuration tool. Accordingly, the administrator does not need to maintain an inventory of free nodes or an inventory of cluster membership or to manually visit each node to configure it as part of the cluster. Thus, the administrative burden to form a cluster or add new nodes to a cluster is significantly simplified.

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as may be suited to the particular use contemplated.

While the foregoing is directed to embodiments of the present disclosure, other and further embodiments of the disclosure may be devised without departing from the basic scope thereof, and the scope thereof is determined by the claims that follow.

What is claimed is:

1. A method for indicating a presence of a node in a distributed computing cluster, the method comprising:
   determining, by operation of one or more computer processors on the node, that the node has not been configured as a member of an existing distributed computing cluster; and
   in response:
   configuring a first network state on the node,
   determining a node identifier (ID) for the node, and
   broadcasting one or more messages advertising the node ID and a network address of a configuration interface hosted by the node, wherein the one or more messages indicate that the node has not been configured as a member of the existing distributed computing cluster and is available to join the existing distributed computing cluster, and wherein the network address is used to configure the node using zero configuration messages.

2. The method of claim 1, wherein the existing distributed computing cluster is a secondary storage system providing backup services for a primary storage system.

3. The method of claim 2, wherein the first network state is configured using a DHCP service to obtain a temporary network address for broadcasting the one or more messages.

4. The method of claim 2, wherein the first network state is configured using a link-local network address assigned to a network interface on the node.

5. The method of claim 2, further comprising:
   receiving, over the configuration interface, configuration data used to configure a second network state on the node;
   configuring the second network state on the node; and
   joining the existing distributed computing cluster.

6. The method of claim 5, wherein the configuration data includes a static IP address to assign to a network interface on the node.

7. The method of claim 2, wherein the one or more messages are broadcast according to a zero configuration protocol, and wherein the node ID and the network address of the configuration interface are store in a TXT record of the messages.

8. A non-transitory computer-readable storage medium storing instructions that, when executed by a processor, cause the processor to perform an operation for indicating a presence of a compute node in an existing distributed computing cluster, the operation comprising:
   determining that the node has not been configured as a member of the existing distributed computing cluster; and in response:
   configuring a first network state on the node,
   determining a node identifier (D) for the node, and broadcasting one or more messages advertising the node ID and a network address of a configuration interface hosted by the node, wherein the one or more messages indicate that the node has not been configured as a member of the existing distributed computing cluster and is available to join the existing distributed computing cluster, and wherein the network address is used to configure the node using zero configuration messages.

9. The non-transitory computer-readable storage medium of claim 8, wherein the existing distributed computing cluster is a secondary storage system providing backup services for a primary storage system.

10. The non-transitory computer-readable storage medium of claim 9, wherein the first network state is configured using a DHCP service to obtain a temporary network address for broadcasting the one or more messages.

11. The non-transitory computer-readable storage medium of claim 9, wherein the first network state is configured using a link-local network address assigned to a network interface on the node.

12. The non-transitory computer-readable storage medium of claim 9, wherein the operation further comprises:
receiving, over the configuration interface, configuration data used to configure a second network state on the node;
configuring the second network state on the node; and
joining the existing distributed computing cluster.

13. The non-transitory computer-readable storage medium of claim 12, wherein the configuration data includes a static IP address to assign to a network interface on the node.

14. The non-transitory computer-readable storage medium of claim 9, wherein the one or more messages are broadcast according to a zero configuration protocol, and wherein the node ID and the network address of the configuration interface are store in a TXT record of the messages.

15. A system comprising:
a processor; and
a memory storing one or more applications, which, when executed on the processor perform an operation for indicating a presence of a compute node in an existing distributed computing duster, the operation comprising:
determining that the node has not been configured as a member of the existing distributed computing duster, and in response:
configuring a first network state on the node;
determining a node identifier (ID) for the node; and
broadcasting one or more messages advertising the node ID and a network address of a configuration interface hosted by the node, wherein the one or more messages indicate that the node has not been configured as a member of the existing distributed computing duster and is available to join the existing distributed computing duster, and wherein the network address is used to configure the node using zero configuration messages.

16. The system of claim 15, wherein the existing distributed computing cluster is a secondary storage system providing backup services for a primary storage system.

17. The computer-readable storage medium of claim 15, wherein the first network state is configured using a DHCP service to obtain a temporary network address for broadcasting the one or more messages.

18. The system of claim 15, wherein the first network state is configured using a link-local network address assigned to a network interface on the node.

19. The system of claim 15, wherein the operation further comprises:
receiving, over the configuration interface, configuration data used to configure a second network state on the node;
configuring the second network state on the node; and
joining the existing distributed computing cluster.

20. The system of claim 19, wherein the configuration data includes a static IP address to assign to a network interface on the node.

21. The system of claim 15, wherein the one or more messages are broadcast according to a zero configuration protocol, and wherein the node ID and the network address of the configuration interface are store in a TXT record of the messages.

22. A method for managing duster membership in an existing distributed computing duster, the method comprising:
detecting a message broadcast by a compute node, wherein the message indicates that the compute node has not been configured as a member of the existing distributed computing cluster and wherein the compute node broadcasts the message using a first configured network state on the compute node;
determining from the message, a node ID and a network address of a configuration interface hosted by the compute node; and
sending the compute node, over the configuration interface, configuration data, wherein the compute node applies the configuration data on the compute node to configure a second network state on the compute node, wherein the compute joins the existing distributed computing duster after configuring the second network state, and wherein the existing distributed computing duster is a secondary storage system providing backup services for a primary storage system, and wherein the network address is used to configure the compute node using zero configuration messages.

* * * * *